United States Patent [19]

Omika et al.

[11] 4,370,453

[45] Jan. 25, 1983

[54] PROCESS FOR PREPARING CATHODIC ELECTRODEPOSITABLE COATING COMPOSITION

[75] Inventors: Hiroyoshi Omika, Yokohama; Hajime Hara, Fujisawa; Yutaka Otsuki, Yokohama; Yoshihiko Araki, Kawasaki; Kazuho Aoyama, Tokyo, all of Japan

[73] Assignee: Nippon Oil Company, Ltd., Tokyo, Japan

[21] Appl. No.: 255,664

[22] Filed: Apr. 20, 1981

[30] Foreign Application Priority Data

Apr. 28, 1980 [JP] Japan ................... 55-55473

[51] Int. Cl.$^3$ ............... C08L 63/00; C09D 3/58; C09D 5/40
[52] U.S. Cl. ............... 525/450; 204/181 C; 525/451; 525/484; 525/531; 528/100; 528/327; 528/331
[58] Field of Search ........ 260/18 EP, 18 PF, 29.2 EP; 204/181 C; 524/901; 525/450, 451, 531, 484; 528/100, 327, 331

[56] References Cited

U.S. PATENT DOCUMENTS

| | | | |
|---|---|---|---|
| 4,139,396 | 2/1979 | Otsuki et al. | 260/18 EP |
| 4,166,017 | 8/1979 | McGinniss | 204/181 C |
| 4,265,793 | 5/1981 | Omika et al. | 260/18 EP |
| 4,277,383 | 7/1981 | Hayashi et al. | 204/181 C |
| 4,283,313 | 8/1981 | Omika et al. | 260/18 EP |

FOREIGN PATENT DOCUMENTS 53-142444 12/1978 Japan ................... 524/901

*Primary Examiner*—Ronald W. Griffin
*Attorney, Agent, or Firm*—Wenderoth, Lind & Ponack

[57] ABSTRACT

A process for preparing a cathodic electrodepositable coating composition which comprises, in sequence, (i) epoxidizing a high-molecular-weight compound containing a carbon-carbon double bond and having a molecular weight of 500 to 10,000 and an iodine value of 100 to 500 to form an epoxidized high-molecular-weight compound containing 0.5 to 12% by weight of oxirane oxygen, (ii) reacting a part of the epoxy groups of the epoxidized high-molecular-weight compound with a basic amine compound of the general formula

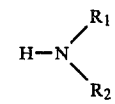

wherein $R_1$ and $R_2$, independently from each other, represent a hydrocarbon group having 1 to 10 carbon atoms which may be partly replaced by a hydroxyl group, and $R_1$ and $R_2$ together may form a cyclic structure, (iii) reacting a part or the whole of the remaining epoxy groups with an α,β-unsaturated monocarboxylic acid of the general formula

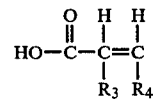

wherein $R_3$ and $R_4$ represent a hydrogen atom or a methyl group, at least one of them being a hydrogen atom, to prepare a resin composition, and (iv) neutralizing the resin composition with an organic or inorganic acid to render it water-soluble or water-dispersible.

6 Claims, No Drawings

PROCESS FOR PREPARING CATHODIC ELECTRODEPOSITABLE COATING COMPOSITION

This invention relates to a cathodic electrodepositable coating composition having excellent low-temperature curability.

A resin having a certain basic group generates a cationic resin in water, and when used in electrodeposition, deposits on the cathode. While conventional anodic electrodepositable coating compositions obtained by water-solubilization of resins having acid groups by neutralization with bases have the inherent defect of metal dissolution in a coating bath from an article being coated, cathodic electrodepositable coating compositions of the aforesaid type are free from this defect and various problems attributed to it.

We previously studied such cathodic electrodepositable coating compositions, and found that a cathodic electrodepositable resin having superior film properties can be obtained by reacting a resin formed by introducing an epoxy group into a synthetic polymer having a low degree of polymerization and containing a carbon-carbon double bond, for example a high-molecular-weight compound containing an unsaturated group such as liquid polybutadiene, with a secondary amine. This technique was applied for a patent (Japanese Laid-Open Patent Publication No. 16048/1978).

The cathodic electrodepositable coating composition comprising the aforesaid resin as a film-forming component cures mainly by the oxidative polymerization of the unsaturated groups of the resin to give a coated film having excellent properties. In order to cure it within a period of time advantageous for practical operations, relatively high baking temperatures are required. Although by adding a metallic dryer such as a water-soluble manganese salt, coated films from such a coating composition may be able to be cured at low baking temperatures, the dryer is required in a large amount, and this gives rise to various problems such as a deterioration in electrodepositing properties (e.g., poor throwing power) and the tendency to surface roughening of the resulting coated films.

It is an object of this invention therefore to provide a cathodic electrodepositable coating composition having excellent low-temperature curability and corrosion resistance by improving the aforesaid reaction product of a high-molecular-weight compound having epoxidized unsaturated groups with a secondary amine.

It has now been found in accordance with this invention that a resin having excellent curability at low temperatures can be obtained by reacting a part of the epoxy groups of a high-molecular-weight compound containing epoxidized unsaturated groups with a secondary amine, and therefore reacting the remaining epoxy groups with a certain α,β-unsaturated monocarboxylic acid.

According to this invention, there is provided a process for preparing a cathodic electrodepositable coating composition which comprises, in sequence, (i) epoxidizing a high-molecular-weight compound containing a carbon-carbon double bond and having a molecular weight of 500 to 10,000 and an iodine value of 100 to 500 to form an epoxidized high-molecular-weight compound containing 0.5 to 12% by weight of oxirane oxygen, (ii) reacting a part of the epoxy groups of the epoxidized high-molecular-weight compound with a basic amine compound of the general formula

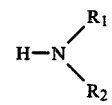

wherein $R_1$ and $R_2$, independently from each other, represent a hydrocarbon group having 1 to 10 carbon atoms which may be partly replaced by a hydroxyl group, and $R_1$ and $R_2$ together may form a cyclic structure, (iii) reacting a part or the whole of the remaining epoxy groups with an α,β-unsaturated monocarboxylic acid of the general formula

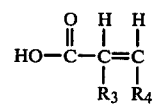

wherein $R_3$ and $R_4$ represent a hydrogen atom or a methyl group, at least one of them being a hydrogen atom, to prepare a resin composition, and (iv) neutralizing the resin composition with an organic or inorganic acid to render it water-soluble or water-dispersible.

The resin composition [to be referred to as the resin composition (a)] in accordance with the invention which is obtained by reacting the epoxidized high-molecular-weight compound with the basic amine compound and the α,β-unsaturated monocarboxylic acid can cure within a short period of time at relatively low temperatures to give a coated film having excellent properties. It has also been found in accordance with this invention that its properties are further improved if (b) a compound of the following general formula

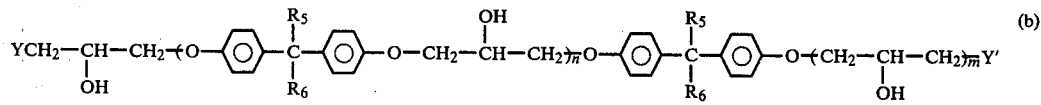

wherein $R_5$ and $R_6$ represent a hydrogen atom or an alkyl group having 1 to 10 carbon atoms, n is an integer of 0 to 20, m is 1 or 0, Y represents a residue of an α,β-unsaturated monocarboxylic acid having 3 or 4 carbon atoms, and Y' represents a hydrogen when m is 0 and is Y when m is 1, or (b') a compound of the following general formula

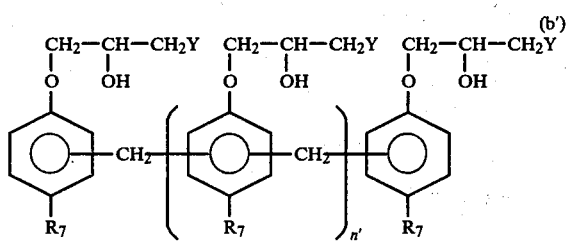

wherein $R_8$ and $R_9$ represent a hydrogen atom or a methyl group, and X represents a hydrogen atom or a bond, and when X is a bond, the carbon atom to which $R_8$ is bonded and the carbon atom to which $R_9$ is bonded may together form part of the main chain, and thereby to form an epoxidized high-molecular-weight compound comprised of a main-chain high-molecular-weight portion (a') having a molecular weight of 500 to 1,000 and an iodine value of 100 to 500 and the epoxy groups of general formula (a'') bonded to the main-chain high-molecular-weight portion (a'). This epoxidation may be performed by utilizing a conventional method which comprises reacting the high-molecular-weight compound with peracetic acid at a temperature of 0° to 100° C. (see Japanese Patent Publications Nos. 3239/1958, 3240/1958 and 15107/1962). The amount of the epoxy groups of the general formula

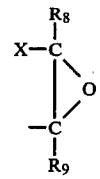

wherein $R_8$, $R_9$ and X are as defined above, is 0.5 to 12.0% by weight, preferably 1.5 to 8.0% by weight, calculated as oxirane oxygen.

If the amount of the epoxy groups is less than 0.5% by weight of oxirane oxygen, the resin obtained by reacting the epoxidized high-molecular-weight compound with the basic amine compound and the unsaturated carboxylic acid has a low content of basic groups leading to poor solubility or dispersibility in water. Or this causes the defect that the amount of the unsaturated carboxylic acid reacted is small, and the curability of the resin at low temperatures cannot be improved.

If, on the other hand, the amount of the epoxy groups is larger than 12.0% by weight as oxirane oxygen, the resin obtained by reaction with the basic amine compound and the α,β-unsaturated monocarboxylic acid has too high a viscosity to be usable for practical purposes.

Then, a part (preferably 0.3 to 9.0% by weight, especially preferably 0.5 to 5.0% by weight, as oxirane oxygen) of the epoxy groups of the resulting epoxidized high-molecular-weight compound are reacted with the basic amine compound of the following general formula

wherein n' is an integer of 0 to 10, $R_7$ represents a hydrogen atom or a hydrocarbon group having 1 to 10 carbon atoms, and Y represents a residue of an α,β-unsaturated monocarboxylic acid having having 3 to 4 carbon atoms, is added to the resin composition (a).

The high-molecular-weight compound used in this invention is an unsaturated high-molecular-weight compound containing a carbon-carbon double bond corresponding to an iodine value of 100 to 500, preferably 200 to 450, and having a number average molecular weight (to be referred to simply as a molecular weight) of 500 to 10,000, preferably 1,000 to 5,000.

Examples of such a high-molecular weight compound include natural oils and fats such as linseed oil, tung oil, soybean oil or dehydrated castor oil, stand oils prepared by heat-treating such natural oils and fats to increase their molecular weights, polymers of low degrees of polymerization of conjugated diolefins such as butadiene, isoprene and piperylene, copolymers of low degrees of polymerization of at least two of these conjugated diolefins, and copolymers of low degrees of polymerization derived from at least one of these conjugated diolefins and an ethylenically unsaturated monomer, especially an aliphatic or aromatic vinyl monomer such as isobutylene, diisobutylene, styrene, α-methylstyrene, vinyltoluene and divinylbenzene. Mixtures of two or more of these with one another can also be used. These polymers with low degrees of polymerization can be produced by conventional known methods.

Petroleum resins having an unsaturated group produced by cationic polymerization of petroleum cracking fractions containing 4 to 10 carbon atoms with a Friedel-Crafts catalyst such as aluminum chloride, boron trifluoride or a complex of these at 0° to 100° C., and a butadiene/isobutylene copolymer having a low degree of polymerization and prepared by using a similar catalyst can also be used as the high-molecular-weight compound in the present invention.

If the molecular weight of the high-molecular-weight compound exemplified above exceeds 10,000, the solubility of the resin composition (a) in water is poor, and if it is less than 500, the strength of a coated film prepared from the resin composition (a) is so low that it cannot be used for practical purposes.

If the iodine value of the high-molecular-weight compound is less than 100, the curability of the resulting coating composition is poor, and if it exceeds 500, the coating composition has poor storage stability unsuitable for practical purposes.

In the first step of the process of this invention, such an unsaturated high-molecular-weight compound as natural oils and fats or conjugated diolefin polymers or copolymers of low degrees of polymerization exemplified hereinabove is epoxidized to introduce epoxy groups of the formula wherein $R_1$ and $R_2$, independently from each other, represent a hydrocarbon group having 1 to 10 carbon atoms which may be replaced partly by a hydroxyl group, and $R_1$ and $R_2$ together may form a cyclic structure.

Thereafter, at least 0.2% by weight, preferably at least 1.0% by weight, of the remaining epoxy groups are reacted with an $\alpha,\beta$-ethylenically unsaturated monocarboxylic acid of the following general formula

wherein $R_3$ and $R_4$ represent a hydrogen atom or a methyl group, and at least one of them is a hydrogen atom, thereby giving a resin composition (a) having unsaturated groups, basic groups, hydroxyl groups and ester groups.

Examples of the secondary amines of general formula (A) used in this invention include aliphatic secondary amines such as dimethylamine, diethylamine, dibutylamine and dioctylamine; secondary alkanolamines such as diethanolamine, monomethylethanolamine and dipropanolamine; aromatic secondary amines such as monomethylbenzylamine; and secondary amines having a cyclic structure such as morpholine and piperidine.

In the above formula (A), $R_1$ and $R_2$ are preferably alkyl or alkanol groups.

The reaction of the organic high-molecular-weight compound containing epoxy groups and double bonds with the secondary amine is carried out at a temperature of 50° to 200° C., preferably 100° to 150° C. The reaction can be performed either in the presence or absence of a solvent. When the high-molecular-weight compound used in the reaction has a low viscosity, it is better not to use a solvent. When it has a high viscosity, there can be used a solvent such as benzene, toluene, xylene, cyclohexane, methyl Cellosolve, ethyl Cellosolve, propyl Cellosolve, butyl Cellosolve, ethylene glycol dimethyl ether and diethylene glycol dimethyl ether.

When using a solvent, it is economically advantageous to use a water-soluble solvent such as ethyl Cellosolve, methyl Cellosolve, butyl Cellosolve, ethylene glycol dimethyl ether and diethylene glycol dimethyl ether as a reaction solvent and subjecting the resulting product directly to a subsequent step of water solubilization.

The reaction of the high-molecular-weight compound containing epoxy groups and a carbon-carbon double bond with the secondary amine can be promoted by adding as a catalyst phenol, an amine salt of p-toluenesulfonic acid, or an amine complex of boron trifluoride.

The amount of epoxy groups in the high-molecular-weight compound to be reacted with the secondary amine is 0.3 to 9.0% by weight, preferably 0.5 to 5.0% by weight, as oxirane oxygen, and it is preferred that at least 0.2% by weight of epoxy groups remain in the high-molecular-weight compound.

If the amount of oxirane oxygen reacted with the secondary amine is less than 0.3% by weight, neutralization of the resulting resin with an acid does not render the resin sufficiently water-soluble. If it exceeds 9.0% by weight, the resulting resin is rendered too soluble in water, and a coated film prepared from it has poor water resistance and is useless for practical applications.

In the manner described above, a high-molecular-weight compound containing basic groups and epoxy groups is synthesized.

A novel feature of the invention is that a part or the whole of the epoxy groups of the aforesaid high-molecular-weight compound containing basic groups and epoxy groups are reacted with the $\alpha,\beta$-unsaturated monocarboxylic acid of the general formula (B)

wherein $R_3$ and $R_4$ are as defined hereinabove, to synthesize the resin composition (a) having excellent curability.

The $\alpha,\beta$-unsaturated monocarboxylic acids of general formula (B) include acrylic acid, methacrylic acid and crotonic acids and mixtures thereof.

The reaction of the epoxy groups with the $\alpha,\beta$-unsaturated monocarboxylic acid of formula (B) is carried out at a temperature of 50° to 200° C., preferably 100° to 150° C.

This reaction can be promoted by adding as a catalyst, a tertiary amine such as dimethylaminoethanol, or a quaternary ammonium salt such as tetraethylene benzyl ammonium chloride.

There is a possibility that the double bonds of the $\alpha,\beta$-unsaturated monocarboxylic acid will polymerize with each other, or copolymerize with the double bonds of the high-molecular-weight compound (a') to form an unwanted polymer. To avoid this possibility, it is preferred to perform the above reaction in the presence of a suitable amount of a polymerization inhibitor such as hydroquinone and BHT added to the reaction system.

The amount of the epoxy groups of the high-molecular-weight compound to be reacted with the $\alpha,\beta$-unsaturated monocarboxylic acid is usually at least 0.2% by weight, preferably at least 1.0% by weight, as oxirane oxygen. Sufficient curing property cannot be obtained if the amount of the oxirane oxygen reacted with the $\alpha,\beta$-unsaturated monocarboxylic acid is less than 0.2% by weight.

According to this invention, there can be obtained a cathodic electrodepositable coating composition comprising the resin composition (a) which has much improved corrosion resistance without impairing its excellent curability and film properties by adding to the resulting resin composition (a), a compound of the following general formula

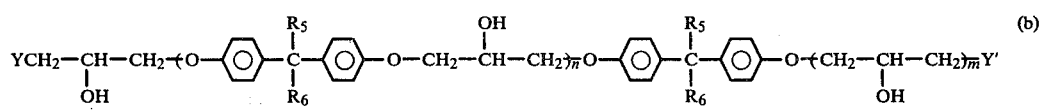

wherein $R_5$ and $R_6$ represent a hydrogen atom or an alkyl group having 1 to 10 carbon atoms, n is an integer of 0 to 20, m is 1 or 0, Y represents a residue of an α,β-unsaturated monocarboxylic acid having 3 or 4 carbon atoms, and Y' represents a hydrogen atom when m is 0 and is Y when m is 1, or a compound of the following general formula

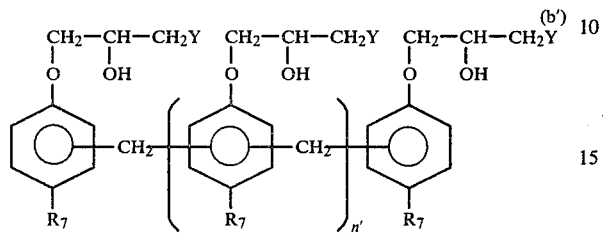

wherein n' is an integer of 0 to 10, $R_7$ represents a hydrogen atom or a hydrocarbon group having 1 to 10 carbon atoms, and Y represents a residue of an α,β-unsaturated monocarboxylic acid having 3 or 4 carbon atoms.

The compound (b) and/or (b') may be added to the resin composition either before, during or after the neutralization of the resin composition.

The compounds (b) and (b') may be added either singly or as a mixture, in an amount of 3 to 1000 parts by weight, preferably 10 to 200 parts by weight, per 100 parts by weight of the resin composition (a).

If the amounts of the compounds (b) and (b') are smaller than the specified limit, the corrosion resistance of a coated film from the resulting composition is not sufficiently improved, and if the contents are larger than the specified limit, the resulting resin composition has poor dispersibility in water. When both of the compounds (b) and (b') are used, the ratio between them is not particularly limited.

The compound of formula (b) can be produced from a glycidyl compound of the formula

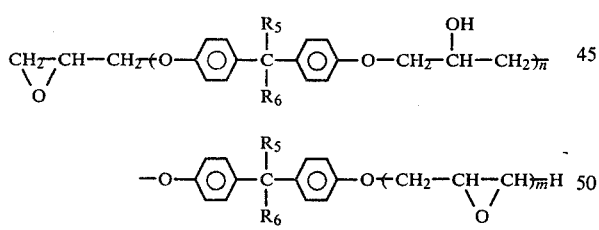

wherein $R_5$ and $R_6$ represent a hydrogen atom or an alkyl group having 1 to 10 carbon atoms, preferably a methyl or ethyl group, n is an integer of 0 to 20, preferably 1 to 5, and m is 0 or 1, preferably 1. This glycidyl compound can usually be prepared by etherifying a bisphenol compound with epichlorohydrin in the presence of an alkali. Examples of such a bisphenol compound include 2,2-bis(4'-hydroxyphenyl)propane, 1,1-bis(4'-hydroxyphenyl)ethane and 1,1-bis(4'-hydroxyphenyl)isobutane. In many cases, by further reacting the aforesaid glycidyl ether with a bisphenol, etc., and then further reacting the product with epichlorohydrin, a glycidyl compound having a somewhat higher molecular weight can be synthesized, and used in this invention.

The compound of formula (b') can be produced by using as a starting material a glycidyl compound of the following formula

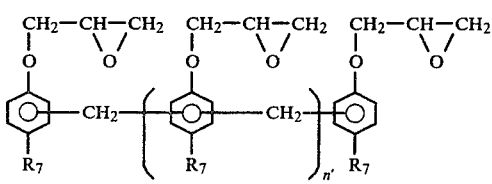

wherein n' and $R_7$ are as defined above. This glycidyl compound can be prepared by reacting a novolak resin with epichlorohydrin.

The aforesaid glycidyl compounds are reacted with α,β-unsaturated monocarboxylic acids at a temperature of 0° to 200° C., preferably 50° to 150° C., to obtain compounds of formula (b) and (b'). The α,β-unsaturated monocarboxylic acids include acrylic acid, methacrylic acid and crotonic acid and mixtures thereof. The reaction can be performed in the presence of a suitable catalyst such as a tertiary amine or a quaternary ammonium salt either in the presence or absence of a solvent. When a solvent is used, it may be of the same kind as the solvent used in the step of reacting the secondary amine in the synthesis of the resin composition (a).

When in the reaction of introducing the group Y into the glycidyl compound, the α,β-unsaturated monocarboxylic acid used is the same compound as the α,β-unsaturated monocarboxylic acid of formula (B) to be reacted with the reaction product of the epoxidized high-molecular-weight compound and the amine of formula (A), the two reactions may be performed simultaneously.

In the present invention, it is required that substantially all of the groups

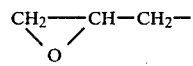

in the glycidyl compound molecules be reacted with the unsaturated carboxylic acid to be converted to groups of the formula

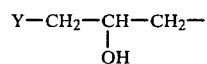

wherein Y is as defined.
If the group

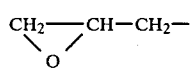

remains, it would react undesirably with the basic groups of the resin composition (a) to form a gel at the time of rendering the resin composition (a) water-soluble with an acid. As a result, the viscosity of the resin composition becomes too high, and it cannot be rendered water-soluble. Even if water-solubilization can be effected, the resulting aqueous solution changes with time, and constant electrodeposition properties or electrodeposited films cannot be obtained.

It has previously been known that bisphenol-type epoxy resins have excellent corrosion resistance. Attempts have been made to render them crosslinkable by leaving a part of the epoxy resins (see Japanese Patent Publications Nos. 23807/1974 and 15860/1976), or by using a blocked isocyanate compound as a crosslinking agent. In order to obtain coated films of practical hardness from coating compositions comprising such epoxy resins, high temperatures of, say, more than 200° C. are required, and even when relatively low temperatures can be used for curing, only a limited narrow range of baking temperatures can be selected.

Furthermore, under commercial electrodeposition conditions, the bisphenol-type epoxy resins should have a high molecular weight above a certain limit, and this naturally results in coated films lacking flexibility. When a blocked isocyanate is used for a resin having a carbon-carbon double bond, oxidative polymerization during baking tends to be inhibited resulting in a coated film having unsatisfactory properties.

It is therefore indeed surprising that according to the present invention, the compounds of formulae (b) and (b') which result from conversion of substantially all of the groups

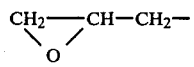

of the glycidyl compound to groups of the formula

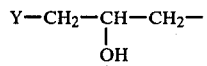

can be used as one component of a cathodic electrodepositable coating composition in combination with the resin composition (a), and this leads to marked improvement of the corrosion resistance of the resin composition (a) without impairing its excellent curability and film properties.

To render the resin composition (a) or a resin composition [to be referred to as a resin composition (c)] obtained by incorporating the compounds (b) and/or (b') in the resin composition (a) water-soluble or water-dispersible, there can be conveniently used a method which comprises neutralizing the resin composition (a) or (c) with 0.1 to 2.0 mole equivalents, preferably 0.2 to 1.0 mole equivalent, based on the amine groups in the resin composition (a) or (c), of an inorganic acid such as hydrochloric acid or sulfuric acid or a water-soluble organic acid such as formic acid, acetic acid, propionic acid or lactic acid. When the compounds (b) and/or (b') is added to the resin compositions (a), it is preferably the resulting resin composition that is to be rendered water-soluble.

The neutralization can usually be achieved by simply mixing the resin composition with the acid at room temperature.

In the present invention, a dryer may be added to the composition obtained by dispersing or dissolving the resin composition (a) or (c) in water. Salts of metals such as manganese, cobalt, zinc and lead may be used as the dryer, and water-soluble manganese compounds are most suitable. Specific examples of the water-soluble manganese compounds are manganese salts of relatively low-molecular-weight organic acids such as manganese formate, manganese acetate, manganese propionate and manganese lactate, and manganese salts of inorganic acids such as manganese sulfate, manganese chloride and manganese nitrates, and manganese complexes such as acetylacetonatomanganese. The amount of the manganese compound added is 0.01 to 5.0 parts by weight, preferably 0.1 to 1.0 part by weight, as manganese metal per 100 parts by weight of the resin composition (a).

In dissolving or dispersing the resin composition (a) or (c) in water, an organic solvent which is water-soluble and is capable of dissolving the resin compositions is preferably added in order to facilitate dissolution or dispersion, increase the stability of the aqueous solution, and to improve the flowability of the resin and the smoothness of the coated film. Examples of such an organic solvents are ethyl Cellosolve, propyl Cellosolve, butyl Cellosolve, ethylene glycol dimethyl ether, diethylene glycol dimethyl ether, diacetone alcohol, 4-methoxy-4-methylpentanone-2 and methyl ethyl ketone. The amount of the organic solvent used for this purpose is 10 to 100 parts by weight per 100 parts by weight of the respective resin composition.

Suitable pigments may also be incorporated in the cathodic electrodepositable coating composition of this invention. Examples of the pigments are iron oxide, lead oxide, strontium chromate, carbon black, titanium dioxide, talc, aluminum silicate and barium sulfate. They may be used either singly or in combination with each other.

Such a pigment may be directly added to the composition of this invention. If desired, however, it is possible to mix a large amount of the pigment with a part of an aqueous dispersion or solution of the resin composition (a) or (c) obtained by neutralization thereby to form a paste-like master batch, and to add the paste-like master batch to the composition (a) or (c).

The following Examples and Comparative Examples illustrate the present invention more specifically. In these examples, the properties of coated films were tested in accordance with JIS K-5400.

PRODUCTION EXAMPLE 1

(1) Liquid polybutadiene having a number average molecular weight of 2,000, a viscosity at 25° C. of 120 poises and a 1,2-bond content of 65%, which had been obtained by polymerizing butadiene to a low degree of polymerization at 30° C. in the presence of benzylsodium as a catalyst and toluene as a chain transfer agent, was epoxidized with peracetic acid to produce epoxidized polybutadiene ($E_1$) having an oxirane oxygen content of 6.0% by weight.

(2) Liquid polybutadiene having a number average molecular weight of 1,000, a viscosity at 25° C. of 15 poises and a 1,2-bond content of 60%, which had been obtained by polymerizing butadiene to a low degree of polymerization at 30° C. in the presence of benzylsodium as a catalyst and toluene as a chain transfer agent, was epoxidized with peracetic acid to produce epoxidized polybutadiene ($E_2$) having an oxirane oxygen content of 8.0% by weight.

PRODUCTION EXAMPLE 2

(1) One thousand grams of a bisphenol-type epoxy resin (Epikote 1001, a trademark for a product of Shell Chemical Co.) having an epoxy equivalent of 500, which is a compound of the following formula

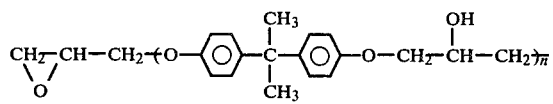

-continued

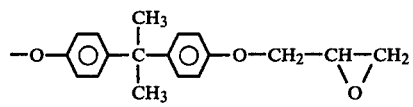

obtained by reacting bisphenol A with epichlorohydrin in the presence of an alkali catalyst, was dissolved in 227 g of ethyl Cellosolve. Then, 137 g of acrylic acid, 0.2 g of hydroquinone and 5 g of N,N-dimethylaminoethanol were added. The mixture was heated to 100° C., and reacted for 5 hours to give an ethyl Cellosolve solution ($EP_1$) of an epoxy resin-acrylic acid adduct.

(2) One thousand grams of a bisphenol-type epoxy resin (Epikote 1001, a trademark for a product of Shell Chemical Co.) having an epoxy equivalent of 500 was dissolved in 233 g of ethyl Cellosolve. Then, 164 g of methacrylic acid, 0.2 g of hydroquinone and 5 g of N,N-dimethylaminoethanol were added. The mixture was reacted under the same conditions as in Production Example 2, (1) above to give an ethyl Cellosolve solution ($EP_2$) of an epoxy resin-methacrylic acid adduct.

(3) One thousand grams of a bisphenol-type epoxy resin having an epoxy equivalent of 500 (Epikote 1001, a trademark for a product of Shell Chemical Co.) was dissolved in 227 g of butyl Cellosolve. Then, 137 g of acrylic acid, 0.2 g of hydroquinone and 5 g of N,N-dimethylaminoethanol were added. The mixture was reacted under the same conditions as in Production Example 2, (1) above to give a butyl Cellosolve solution ($EP_3$) of an epoxy resin-acrylic acid adduct.

(4) One thousand grams of a bisphenol-type epoxy resin having an epoxy equivalent of 1,000 (Epikote 1004, a trademark for a product of Shell Chemical Co.) was dissolved in 214 g of butyl Cellosolve, and 69 g of acrylic acid, 0.1 g of hydroquinone, and 5 g of N,N-dimethylaminoethanol were added. The mixture was reacted under the same conditions as in Production Example 2, (1) to give a butyl Cellosolve solution ($EP_4$) of an epoxy resin-acrylic acid adduct.

(5) One thousand grams of a novolak epoxy resin having an epoxy equivalent of 180 (Epikote 154, a trademark for a product of Shell Chemical Co.) was dissolved in 277 g of ethyl Cellosolve, and then 383 g of acrylic acid, 0.1 g of hydroquinone and 5 g of N,N-dimethylaminoethanol were added. The mixture was reacted under the same conditions as in Production Example 2, (1) above to give an ethyl Cellosolve solution ($EP_5$) of an epoxy resin-acrylic acid adduct.

EXAMPLE 1

(1) A 2-liter autoclave was charged with 1,076 g of the epoxidized polybutadiene ($E_1$) produced in Production Example 1, (1) and 215 g of ethyl Cellosolve, and 50 g of dimethylamine was added. The mixture was reacted at 150° C. for 5 hours. The unreacted amine was distilled off, and then a mixture consisting of 83 g of acrylic acid, 7 g of hydroquinone and 27 g of ethyl Cellosolve was added. The reaction was further carried out at 150° C. for 45 minutes to give a resin composition ($L_1$) having an amine value of 40 mg KOH/g, an acid value of 1 mg KOH/g and a solids content of 83.3% by weight.

(2) Acetic acid (6.2 g) was added to 260 g of the resin composition ($L_1$) obtained in Example 1, (1) above, and the mixture was well stirred. Deionized water was added to prepare a clear aqueous solution having a solids content of 20% by weight. To the aqueous solution was added a solution of 2.3 g of manganese acetate in 710 g of deionized water. The solution was taken into a 2-liter glass beaker as an electrodepositable coating solution.

The resulting electrodepositable coating solution was electrodeposited on an untreated steel plate [G. 3141 (SPCC-SD), 0.6×70×150 mm; a product of Nippon Test Panel Co., Ltd.] as a cathode using a carbon anode under the conditions shown in Table 1. The results of the test are shown in Table 1.

EXAMPLE 2

Five hundred grams of the resin composition ($L_1$) obtained in Example 1, (1) and 100 g of the ethyl Cellosolve solution ($EP_1$) of an epoxy resin-acrylic acid adduct synthesized in Production Example 2, (1) were put into a 2-liter separable flask, and stirred at 80° C. for 1 hour. The mixture was then cooled to room temperature and neutralized with 10.6 g of acetic acid. Furthermore, deionized water was added to prepare an aqueous solution having a solids content of 30% by weight.

The resulting aqueous solution having a solids content of 30% (250 g), 20.8 g of carbon black, 104.2 g of lead oxide and 375 g of glass beads were put into a 1-liter stainless steel beaker, and vigorously stirred in a high-speed rotary mixer for 2 hours. Then, the glass beads were removed by filtration to prepare a pigment paste having very good water dispersibility.

Fifty grams of the pigment paste and 909 g of the aforesaid aqueous solution having a solids content of 30% by weight were put into a 2-liter glass beaker, and a solution of 2.5 g of manganese acetate in 1035 g of deionized water was added to prepare an electrodepositable coating solution.

Electrodeposition was performed by using the resulting coating solution in the same way as in Example 1. The results are shown in Table 1.

EXAMPLE 3

(1) The epoxidized polybutadiene ($E_1$) produced in Production Example 1, (1) (571 g) and 114 g of ethyl Cellosolve were put into a 2-liter autoclave, and then 26.5 g of dimethylamine was added. The mixture was reacted at 150° C. for 5 hours. The unreacted amine was distilled off, and a mixture consisting of 26 g of acrylic acid, 4 g of hydroquinone and 6 g of ethyl Cellosolve was added. The reaction was further carried out at 150° C. for 1 hour to produce a resin composition ($L_2$) having an amine value of 42 mg KOH/g, an acid value of 0.5 mg KOH/g and a solids content of 83.5% by weight.

(2) Five hundred grams of the resin composition ($L_2$) was taken into a 2-liter separable flask, and 100 g of the ethyl Cellosolve solution ($EP_5$) of an epoxy resin-acrylic acid adduct synthesized in Production Example 2, (5) was added. The mixture was stirred at 80° C. for 1 hour, then cooled to room temperature, and neutralized with 11.1 g of acetic acid. Deionized water was added to prepare an aqueous solution having a solids content of 30% by weight.

To 250 g of the resulting aqueous solution were added 20.8 g of carbon black and 104.2 g of lead oxide, and a pigment paste was prepared in the same way as in Example 2.

Fifty grams of the pigment paste and 909 g of the above aqueous solution having a solids content of 30% by weight were put into a 2-liter glass beaker, and a solution of 2.5 g of manganese acetate in 1035 g of deionized water was added to prepare an electrodepositable coating solution.

Electrodeposition was performed by using the resulting coating solution in the same way as in Example 1. The results are shown in Table 1.

EXAMPLE 4

(1) A 2-liter autoclave was charged with 608 g of the epoxidized polybutadiene ($E_1$) produced in Production Example 1, (1) and 121 g of ethyl Cellosolve, followed by addition of 28.8 g of dimethylamine. The mixture was reacted at 150° C. for 5 hours. The unreacted amine was distilled off, and a mixture consisting of 55 of methacrylic acid, 4 g of hydroquinone and 12 g of ethyl Cellosolve was added. The mixture was further reacted at 150° C. for 45 minutes to produce a resin composition ($L_3$) having an amine value of 40.5 mg KOH/g, an acid value of 2 mg KOH/g and a solids content of 83.2% by weight.

(2) Five hundred grams of the resin composition ($L_3$) was put into a 2-liter separable flask, and 100 g of the ethyl Cellosolve solution ($EP_2$) of an epoxy resin-methacrylic acid adduct synthesized in Production Example 2, (2) was added. The mixture was stirred at 80° C. for 1 hour, then cooled to room temperature, and neutralized with 10.6 g of acetic acid. Furthermore, deionized water was added to prepare an aqueous solution having a solids content of 30% by weight.

Carbon black (20.8 g) and 104.2 g of lead oxide were added to 250 g of the aqueous solution, and a pigment paste was prepared in the same way as in Example 2.

The pigment paste (50 g) and 909 g of the above aqueous solution having a solids content of 30% by weight were put into a 2-liter glass beaker, and a solution of 2.5 g of manganese acetate in 1035 g of deionized water was added to prepare an electrodepositable coating solution.

Electrodeposition was performed by using the coating solution by the same operation as in Example 1. The results are shown in Table 1.

EXAMPLE 5

(1) A 3-liter separable flask equipped with a reflux condenser was charged with 902 g of the epoxidized polybutadiene ($E_1$) produced in Production Example 1, (1), 171 g of diethanolamine and 18 g of phenol, and they were reacted at 180° C. for 5 hours. The unreacted materials were then distilled off under reduced pressure.

The reaction mixture was cooled to 150° C., and a mixture consisting of 70 g of acrylic acid, 6 g of hydroquinone and 230 g of butyl Cellosolve was added. The mixture was reacted further at 150° C. for 45 minutes to produce a resin composition ($L_4$) having an amine value of 46 mg KOH/g, an acid value of 2 mg KOH/g and a solids content of 83.3% by weight.

(2) Five hundred grams of the resin composition ($L_4$) was put into a 2-liter separable flask, and 100 g of the butyl Cellosolve solution ($EP_3$) of an epoxy resin-acrylic acid adduct synthesized in Production Example 2, (3) was added. The mixture was stirred at 80° C. for 1 hour, then cooled to room temperature, and neutralized with 12 g of acetic acid. Deionized water was further added to prepare an aqueous solution having a solids content of 30% by weight.

To 250 g of the resulting aqueous solution were added 20.8 g of carbon black and 104.2 g of lead oxide, and a pigment paste was prepared in the same way as in Example 2.

Fifty grams of the pigment paste and 209 g of the above aqueous solution having a solids content of 30% by weight were put into a 2-liter glass beaker, and a solution of 2.5 g of manganese acetate in 1035 g of deionized water was added to prepare an electrodepositable coating solution.

Electrodeposition was performed by using the coating solution by the same operation as in Example 1. The results are shown in Table 1.

EXAMPLE 6

(1) A 5-liter separable flask equipped with a reflux condenser was charged with 2200 g of the epoxidized polybutadiene ($E_2$) produced in Production Example 1, (2), 183 g of diethanolamine, 126 g of monomethylethanolamine and 80 g of phenol, and they were reacted at 180° C. for 5 hours. The unreacted materials were distilled off under reduced pressure. The reaction mixture was then cooled to 150° C., and a mixture consisting of 171 g of acrylic acid, 14.6 g of hydroquinone and 536 g of butyl Cellosolve was added. The mixture was reacted at 110° C. for 5 hours to produce a resin composition ($L_5$) having an amine value of 62.2 mg KOH/g, an acid value of 0.5 mg KOH/g and a solids content of 83.0% by weight.

(2) Five hundred grams of the resin composition ($L_5$) was put into a 2-liter separable flask, and 100 g of the butyl Cellosolve solution ($EP_4$) of an epoxy resin-acrylic acid adduct synthesized in Production Example 2, (4) was added. The mixture was stirred at 80° C. for 1 hour, cooled to room temperature, and neutralized with 16.5 g of acetic acid. Deionized water was added to prepare an aqueous solution having a solids content of 30% by weight.

To 250 g of the aqueous solution were added 20.8 g of carbon black and 104.2 g of lead oxide, and a pigment paste was prepared in the same way as in Example 2.

Fifty grams of the pigment paste and 909 g of the above aqueous solution having a solids content of 30% by weight were put into a 2-liter glass beaker, and a solution of 2.5 g of manganese acetate in 1035 g of deionized water was added to prepare an electrodepositable coating solution.

Electrodeposition was performed by using the resulting coating solution by the same operation as in Example 1. The results are shown in Table 1.

COMPARATIVE EXAMPLE 1

(1) A 2-liter autoclave was charged with 1160 g of the epoxidized polybutadiene ($E_1$) produced in Production Example 1, (1) and 232 g of ethyl Cellosolve, followed by addition of 53 g of dimethylamine. The mixture was reacted at 150° C. for 5 hours. The unreacted amine was distilled off to give a resin composition ($L_6$) having an amine value of 46 mg KOH/g and a solids content of 83.5% by weight.

(2) Acetic acid (8.2 g) was added to 300 g of the resin composition ($L_6$), and a clear aqueous solution having a solids content of 20% by weight was prepared in the same way as in Example 1, (2). To the aqueous solution was added a solution of 2.9 g of manganese acetate in 820 g of deionized water, and the mixed solution was put into a 2-liter glass beaker as an electrodepositable coating solution.

Electrodeposition was performed by using the resulting coating solution by the same operation as in Example 1. The results are shown in Table 1.

COMPARATIVE EXAMPLE 2

Five hundred grams of the resin composition (L$_6$) obtained in Comparative Example 1, (1) and 100 g of the ethyl Cellosolve solution (EP$_1$) of an epoxy resin-acrylic acid adduct synthesized in Production Example 2, (1) were put into a 2-liter separable flask, and stirred at 80° C. for 1 hour. The mixture was then cooled to room temperature, and neutralized with 12.1 g of acetic acid. Deionized water was added to prepare an aqueous solution having a solids content of 30% by weight.

To 250 g of the resulting aqueous solution were added 20.8 g of carbon black and 104.2 g of lead oxide, and a pigment paste was prepared in the same way as in Example 2.

Fifty grams of the pigment paste and 909 g of the above aqueous solution having a solids content of 30% by weight were put into a 2-liter glass beaker, and a solution of 2.9 g of manganese acetate in 1035 g of deionized water was added to prepare an electrodepositable coating solution.

Electrodeposition was performed by using the resulting coating solution by the same operation as in Example 1. The results are shown in Table 1.

COMPARATIVE EXAMPLE 3

(1) A 2-liter separable flask equipped with a reflux condenser was charged with 1000 g of the epoxidized polybutadiene (E$_2$) produced in Production Example 1, (2), 83.2 g of diethanolamine, 57.3 g of monomethylethanolamine and 36 g of phenol, and they were reacted at 180° C. for 5 hours. The unreacted materials were distilled off under reduced pressure to produce a resin composition (L$_7$) having an amine value of 75 mg KOH/g.

(2) Five hundred grams of the resin composition (L$_7$) was put into a 2-liter separable flask, and 100 g of the butyl Cellosolve solution (EP$_4$) of an epoxy resin-acrylic acid adduct synthesized in Production Example 2, (4) was added. The mixture was stirred at 80° C. for 1 hour, then cooled to room temperature, and neutralized with 16.5 g of acetic acid. Deionized water was further added to prepare an aqueous solution having a solids content of 30% by weight.

To 250 g of the aqueous solution were added 20.8 g of carbon black and 104.2 g of lead oxide, and a pigment paste was prepared in the same way as in Example 2.

Fifty grams of the pigment paste and 909 g of the above aqueous solution having a solids content of 30% by weight were put into a 2-liter glass beaker, and a solution of 2.5 g of manganese acetate in 1035 g of deionized water was added to prepare an electrodepositable coating solution.

Electrodeposition was performed by using the resulting coating solution by the same operation as in Example 1. The results are shown in Table 1.

A comparison of Examples 1 to 6 with Comparative Examples 1 to 3 clearly shows that a cathodic electrodepositable coating composition comprising as an essential ingredient a resin composition obtained by reacting epoxidized polybutadiene with a secondary amine and an α,β-unsaturated monocarboxylic acid gives a coating having higher hardness and solvent resistance even at low baking temperatures than a cathodic electrodepositable coating composition containing a reaction product of epoxidized polybutadiene with a secondary amine. It is also seen that by incorporating the compound (b) or (b') or both obtained, for example, by reacting an epoxy resin or a novolak resin with an unsaturated carboxylic acid into the aforesaid resin composition, a cathodic electrodepositable coating composition having very good corrosion resistance can be obtained without a degradation in the excellent low-temperature curability of the aforesaid resin composition.

TABLE 1

| Example (Ex.) or Comparative Example (CEx.) | | Ex. 1 | Ex. 2 | Ex. 3 | Ex. 4 | Ex. 5 | Ex. 6 | CEx. 1 | CEx. 2 | CEx. 3 |
|---|---|---|---|---|---|---|---|---|---|---|
| Properties of the coating solution | pH | 6.5 | 6.6 | 6.7 | 6.5 | 6.0 | 6.2 | 6.6 | 6.6 | 6.3 |
| | Electric conductivity (mΩ/cm) | 1.8 | 1.7 | 1.8 | 1.8 | 1.4 | 1.5 | 1.9 | 1.7 | 1.5 |
| Properties of the electrodeposited film | Film breaking voltage (V) | 200 | 350 | 350 | 350 | 320 | 320 | 150 | 300 | 300 |
| | Film resistance (KΩ-cm$^2$) (*1) | 60 | 1,000 | 800 | 800 | 400 | 600 | 60 | 300 | 200 |
| | Coulomb efficiency (mg/c) | 15 | 18 | 20 | 20 | 17 | 18 | 15 | 18 | 21 |
| Coating conditions | Voltage (V) | 120 | 250 | 200 | 250 | 200 | 200 | 30 | 200 | 200 |
| | Time (minutes) | 3 | 3 | 3 | 3 | 3 | 3 | 3 | 3 | 3 |
| Baking conditions (°C. × min.) | | 180 × 30 | 180 × 30 | 180 × 30 | 180 × 30 | 160 × 30 | 160 × 30 | 180 × 30 | 180 × 30 | 160 × 30 |
| Thickness of the coated film (μ) | | 18 | 18 | 20 | 19 | 20 | 20 | 18 | 19 | 20 |
| Physical tests | Pencil hardness | F | 2H | 2H | 2H | 2H | 2H | 4B | B | 3B |
| | Erichsen (mm) (*5) | >7 | >7 | >7 | >7 | 7 | 6 | >7 | >7 | >7 |
| | Impact strength (cm) (*2) Front | >50 | >50 | >50 | >50 | 40 | 30 | >50 | >50 | >50 |
| | Back | >50 | >50 | >50 | >50 | 10 | <10 | >50 | >50 | >50 |
| Chemical tests | Solvent resistance (*3) | O | O | O | O | O | O | X | X | X |
| | Corrosion resistance (200 hours) | Δ | ⊙ | ⊙ | ⊙ | ⊙ | ⊙ | X | X | X |

TABLE 1-continued

| Example (Ex.) or Comparative Example (CEx.) | Ex. 1 | Ex. 2 | Ex. 3 | Ex. 4 | Ex. 5 | Ex. 6 | CEx. 1 | CEx. 2 | CEx. 3 |
|---|---|---|---|---|---|---|---|---|---|
| (*4) | | | | | | | | | |

Note to Table 1

(*1) Calculated from the following equation.

$$\frac{\text{Coating voltage (V)}}{\text{Residual current (A)}} \times \text{Surface area of an article coated (cm}^2\text{)}$$

(*2) Du Pont impact strength (500 g, $\frac{1}{2}$B)

(*3) A rubbing test using methyl isobutyl ketone, and the results are evaluated as follows:
O: No change
Δ: The rubbed portion becomes cloudy.
X: The substrate is exposed.

(*4) The maximum rust width (mm) from a cut portion provided in the coated film (a spray of a 5% aqueous solution of NaCl). Evaluated on the following scale:
⊚: less than 1 mm
O: 1 to 2 mm
Δ: more than 2 mm to 3 mm
X: more than 3 mm (*5) The maximum radius of an extruded portion of the coated film, which not cause breakage of the coated film.

What we claim is:

1. A process for preparing a cathodic electrodepositable coating composition which comprises, in sequence,
   (i) epoxidizing a high-molecular-weight compound containing a carbon-carbon double bond and having a molecular weight of 500 to 10,000 and an iodine value of 100 to 500 to form an epoxidized high-molecular-weight compound containing 0.5 to 12% by weight of oxirane oxygen,
   (ii) reacting a part of the epoxy groups of the epoxidizing high-molecular-weight compound with a basic amine compound of the general formula $$H-N\begin{matrix}R_1\\R_2\end{matrix}$$

wherein $R_1$ and $R_2$, independently from each other, represent a hydrocarbon group having 1 to 10 carbon atoms which may be partly replaced by a hydroxyl group, and $R_1$ and $R_2$ together may form a cyclic structure, (iii) reacting a part or the whole of the remaining epoxy groups with an α,β-unsaturated monocarboxylic acid of the general formula $$\begin{matrix}O & H & H\\ \| & | & |\\ HO-C-C=C\\ & | & |\\ & R_3 & R_4\end{matrix}$$

wherein $R_3$ and $R_4$ represent a hydrogen atom or a methyl group, at least one of them being a hydrogen atom, to prepare a resin composition, and
   (iv) neutralizing the resin composition with an organic or inorganic acid to render it water-soluble or water-dispersible.

2. The process of claim 1 wherein between steps (iii) and (iv), during step (iv), or after step (iv), there is added a compound of the general formula $$YCH_2-\underset{OH}{\overset{}{C}H}-CH_2\text{-}\!\!\left(\!O-\!\!\bigcirc\!\!-\underset{R_6}{\overset{R_5}{C}}-\!\!\bigcirc\!\!-O-CH_2-\underset{}{\overset{OH}{C}H}-CH_2\!\right)_{\!\!n}\!\!O-\!\!\bigcirc\!\!-\underset{R_6}{\overset{R_5}{C}}-\!\!\bigcirc\!\!-O\text{-}\!\!\left(CH_2-\underset{OH}{\overset{}{C}H}-CH_2\right)_{\!\!m}\!\!Y'$$

wherein $R_5$ and $R_6$ represent a hydrogen atom or an alkyl group having 1 to 10 carbon atoms, n is an integer of 0 to 20, m is 1 or 0, Y represents a residue of an α,β-unsaturated monocarboxylic acid having 3 or 4 carbon atoms, and Y' represents a hydrogen when m is 0 and is Y when m is 1, or a compound of the general formula $$\begin{matrix}CH_2-CH-CH_2Y & CH_2-CH-CH_2Y & CH_2-CH-CH_2Y\\ | \quad | & | \quad | & | \quad |\\ O \quad OH & O \quad OH & O \quad OH\end{matrix}$$

$$\bigcirc\!\!-CH_2\!\!-\!\!\left(\bigcirc\!\!-CH_2\right)_{\!\!n'}\!\!\bigcirc$$

$$R_7 \qquad R_7 \qquad R_7$$

wherein n' is an integer of 0 to 10, $R_7$ represents a hydrogen atom or a hydrocarbon group having 1 to 10 carbon atoms, and Y represents a residue of an α,β-unsaturated monocarboxylic acid having 3 or 4 carbon atoms.

3. The process of claim 1 or 2 wherein the high-molecular-weight compound to be epoxidized in step (i) is selected from the group consisting of a polymer of a conjugated diolefin containing 4 to 8 carbon atoms, a copolymer of at least two conjugated diolefins containing 4 to 8 carbon atoms, a copolymer of at least one conjugated diolefin containing 4 to 8 carbon atoms and a vinyl monomer having ethylenic unsaturation containing 2 to 20 carbon atoms, a natural oil, a natural fat and a petroleum resin produced by cationic polymerization of petroleum cracking fractions containing 4 to 10 carbon atoms with a Friedel-Crafts catalyst.

4. The process of claim 1 or 2 wherein 0.3 to 0.9% as oxirane oxygen of the entire epoxy groups of the epoxidized high-molecular-weight compound are reacted with the basic amine compound in step (ii).

5. The process of claim 1 or 2 wherein at least 0.2% by weight, as oxirane oxygen, of the remaining epoxy groups left after reaction with the basic amine compound are reacted with the α,β-unsaturated carboxylic acid in step (iii).

6. The process of claim 1 or 2 wherein the reaction in step (iii) is carried out at a temperature of 50° to 200° C.

* * * * *